(12) United States Patent
Ljung

(10) Patent No.: US 9,743,420 B2
(45) Date of Patent: Aug. 22, 2017

(54) DOWNLINK SCHEDULING ACCORDING TO BEAM ANGLES

(71) Applicant: TELEFONAKTIEBOLAGET L M ERICSSON (PUBL), Stockholm (SE)

(72) Inventor: Petter Ljung, Enskededalen (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 299 days.

(21) Appl. No.: 14/437,552

(22) PCT Filed: Oct. 29, 2012

(86) PCT No.: PCT/SE2012/051172
§ 371 (c)(1),
(2) Date: Apr. 22, 2015

(87) PCT Pub. No.: WO2014/070050
PCT Pub. Date: May 8, 2014

(65) Prior Publication Data
US 2015/0264701 A1    Sep. 17, 2015

(51) Int. Cl.
H04W 72/12       (2009.01)
H04B 7/0452      (2017.01)
H04B 7/06        (2006.01)

(52) U.S. Cl.
CPC ........ H04W 72/121 (2013.01); H04B 7/0452 (2013.01); H04B 7/0617 (2013.01); H04W 72/1247 (2013.01); H04W 72/1273 (2013.01)

(58) Field of Classification Search
CPC .... H04W 72/12; H04W 72/121; H04W 72/04
USPC ............... 455/450, 452.1, 25, 63.4
See application file for complete search history.

(56) References Cited

U.S. PATENT DOCUMENTS

2001/0020917 A1*  9/2001  Hamada ............... G01S 1/38
                                                342/442
2007/0243878 A1* 10/2007  Taira .................. H04B 7/024
                                                455/450

FOREIGN PATENT DOCUMENTS

| EP | 2271009 A1    | 1/2011  |
|----|---------------|---------|
| JP | 2008236222 A  | 10/2008 |
| WO | 2006078144 A1 | 7/2006  |
| WO | 2008004922 A1 | 1/2008  |
| WO | 2010105683 A1 | 9/2010  |
| WO | 2012083500 A1 | 6/2012  |

* cited by examiner

*Primary Examiner* — Kamran Afshar
*Assistant Examiner* — Farideh Madani

(57) ABSTRACT

Disclosed is a method performed by a radio base station, RBS, in a wireless communication network for controlling transmission of signals from the RBS to user equipments, UEs. The RBS uses beam forming to direct a signal towards a receiving UE. The method comprises: determining transmission directions to a plurality of UEs served by the RBS, instructing to transmit a signal in a determined first transmission direction D1 to a first UE of the plurality of UEs. The method further comprises calculating a first difference Δ2 between the first transmission direction D1 and a determined second transmission direction D2 to a second UE, and calculating a second difference Δ3 between the first transmission direction D1 and a determined third transmission direction D3 to a third UE, and scheduling transmission of signals to the second UE and the third UE based on the calculated first and second differences in transmission direction Δ2 and Δ3, respectively. A corresponding RBS is also disclosed.

15 Claims, 4 Drawing Sheets

DOWNLINK SCHEDULING ACCORDING TO BEAM ANGLES

TECHNICAL FIELD

The present disclosure relates generally to a method, a computer program, and a radio base station, RBS, in a wireless communication network for controlling transmission of signals from the RBS to user equipments, UEs, wherein the RBS uses beam forming to direct a signal towards a receiving UE.

BACKGROUND

Traditionally, in a wireless communication system, an RBS transmits downlink, DL, signals to user equipments, UEs, by broadcasting the DL signals in the entire cell which is covered by the RBS. In other words, the energy of a DL signal is broadcasted in the entire cell independent of the location of the UE to which the DL signals are to be received, hereinafter called the receiving UE.

To be able to concentrate the energy of DL signals in a direction from the RBS towards the receiving UE, a method called beam forming is used. In beam forming, an RBS is equipped with multiple antennas. The antennas are individually supplied with a weighted amount of the DL signal in such a way that the individual signals, when transmitted from the RBS, experience constructive interference between each other at a transmission angle towards a receiving UE while at other angles the individual signals experience destructive interference. As a result, the overlapping total DL signal will be concentrated in the direction towards the receiving UE.

The advantages of beam forming are, among others, increased signal strength at the location of the receiving UE, and reduced average interference to other cells. These advantages come as a result of the energy concentration in the direction towards the receiving UE. As a result, the signal to interference ratio (SINR) at the receiving UE is improved.

However, one drawback with beam forming is that it creates high interference variations in neighbor cells, which has a negative impact on link adaption in the neighboring cells. This phenomenon is shown in FIG. 1, which shows two neighboring cells at three different, consecutive transmission time intervals, TTI: TTI1, TTI2, TTI3 in a possible transmission scenario. In the transmission scenario, a wireless network comprises a first RBS 20 providing coverage in a first cell 22, and a second RBS 30 providing coverage in a second cell 32. There are also a first UE 12 and a second UE 14 located in the first cell 22, and a UE 16 located in the second cell 32.

In TTI1, a DL signal from the first RBS 20 is formed and directed as a beam 42 towards the first UE 12 in the first cell 22. During TTI1 the UE 16 in the second cell 32 experiences no, or at least very low intercell interference from the first cell 22, since the UE 16 in the second cell 32 is not in a location where it is exposed to the beam 42 from the first RBS 20.

In the following TTI, TTI2, on the other hand, the direction of the beam 42 is pointing towards the second UE 14 in the first cell 22. During the TTI2, the UE 16 in the second cell 32 experiences high inter-cell interference from the first cell 22, since the UE 16 in the second cell is exposed to the beam 42 from the first RBS 20.

In the TTI3, following the TTI2, the direction of the beam 42 is now pointing back towards the first UE 12 again. Consequently, during TTI3 the UE 16 in the second cell again experiences no, or very low intercell interference from the first cell 22.

As shown, beam forming can create large interference variations in neighbor cells between consecutive TTIs. These interference variations make it difficult for the link adaption in the neighbor cells to select a suitable Modulation Coding Scheme, MCS, for the UEs, which may lead to a reduced user throughput.

Consequently, it would be advantageous to be able to reduce the interference variations in neighbor cells between consecutive TTIs, occurring when an RBS transmits DL signals using beam forming.

SUMMARY

It is an object of the invention to address at least some of the problems and issues outlined above. It is possible to achieve these objects and others by using a method and an RBS as defined in the attached independent claims.

According to one aspect, a method is disclosed performed by an RBS in a wireless communication network for controlling transmission of signals from the RBS to UEs. The RBS uses beam forming to direct a signal towards a receiving UE. The method comprises determining transmission directions to a plurality of UEs served by the RBS and instructing to transmit a signal in a determined first transmission direction, D1, to a first UE of the plurality of UEs. The method further comprises calculating a first difference, $\Delta 2$, between the first transmission direction, D1, and a determined second transmission direction, D2, to a second UE. The method further comprises calculating a second difference, $\Delta 3$, between the first transmission direction, D1, and a determined third transmission direction, D3, to a third UE, and scheduling transmission of signals to the second UE and the third UE based on the calculated first and second differences in transmission direction, $\Delta 2$ and $\Delta 3$, respectively.

By such a method the UEs can be scheduled such that interference variations in neighbor cells are lowered, which makes it easier for the neighbor cell link adaption to adapt to the radio environment and increases throughput in the neighbor cells.

According to another aspect, an RBS is provided in a wireless communication network, which RBS is configured for controlling transmission of signals from the RBS to UEs. The RBS is arranged to use beam forming to direct a signal towards a receiving UE. The RBS comprises a determining unit configured for determining transmission directions to a plurality of UEs served by the RBS and an instruction unit configured for instructing to transmit a signal in a determined first transmission direction D1 to a first UE of the plurality of UEs. The RBS further comprises a calculation unit configured for calculating a first difference $\Delta 2$ between the first transmission direction D1 and a determined second transmission direction D2 to a second UE, and for calculating a second difference $\Delta 3$ between the first transmission direction D1 and a determined third transmission direction D3 to a third UE. The RBS further comprises a scheduling unit configured for scheduling transmission of signals to the second UE and the third UE based on the calculated first and second differences in transmission direction $\Delta 2$ and $\Delta 3$, respectively.

According to a third aspect, a computer program is provided. The computer program comprises computer readable code means, which when run in an RBS causes the RBS to perform the following step: determining transmission directions to a plurality of UEs served by the RBS; instructing to transmit a signal in a determined first transmission direction D1 to a first UE of the plurality of UEs; calculating a first difference Δ2 between the first transmission direction D1 and a determined second transmission direction D2 to a second UE; calculating a second difference Δ3 between the first transmission direction D1 and a determined third transmission direction D3 to a third UE, and scheduling transmission of signals to the second UE and the third UE based on the calculated first and second differences in transmission direction Δ2 and Δ3, respectively.

The above method, RBS and computer program may be configured and implemented according to different optional embodiments. In one possible embodiment, the second UE and the third UE are scheduled based on the calculated differences in transmission direction Δ2 and Δ3 such that if Δ2 is lower than Δ3, the transmission of a signal to the second UE is scheduled with a higher priority than the transmission of a signal to the third UE. As a result, the UEs are scheduled such that interference variations in neighbor cells are lowered.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to generate less rapid interference variations in cells that are neighbors to a cell for which coverage is provided by an RBS that transmits DL signals using beam forming techniques. By achieving less rapid interference variations compared to today's beam forming transmitting techniques, an improved link adaption and higher throughput is achieved in the neighboring cells. According to an embodiment, this is achieved by determining transmission directions to each UE of a plurality of UEs in the cell served by the RBS. Further, a first difference Δ2 between a determined transmission direction D1 to a currently receiving UE and a determined second transmission direction D2 to a second UE is calculated, and a second difference Δ3 between the determined transmission direction D1 and a determined third transmission direction D3 to a third UE is calculated. Thereafter, the following transmission after the current transmission to the receiving UE, in e.g. the next transmission time interval, is scheduled for the second and third UE based on the calculated differences in transmission direction Δ2 and Δ3, respectively. If Δ2 is lower than Δ3, the second UE is scheduled with a higher priority than the third UE. A "currently receiving UE" may also be the UE last receiving a transmission, in case there is currently a DL transmission interruption in the cell.

In other words, transmission directions may be determined to each UE of a plurality of UEs in a cell that are to receive DL signals. Thereafter, the determined transmission directions may be incorporated in a scheduling decision regarding which UE to schedule the following transmission in the following way: A UE that has a small difference in DL transmission direction compared to a transmission direction to a UE currently being scheduled is scheduled with an increased priority. A UE that has a large difference in DL transmission direction compared to the transmission direction to the UE currently being scheduled is scheduled with a decreased priority.

As a result, the DL transmission beam is less likely to make large changes in direction between consecutive TTIs, something that will lead to less rapid interference variations in neighbor cells and thus make it easier for the link adaption to adapt to the radio environment. Also, the algorithm is easy to incorporate with existing scheduler algorithms.

Figure 1:
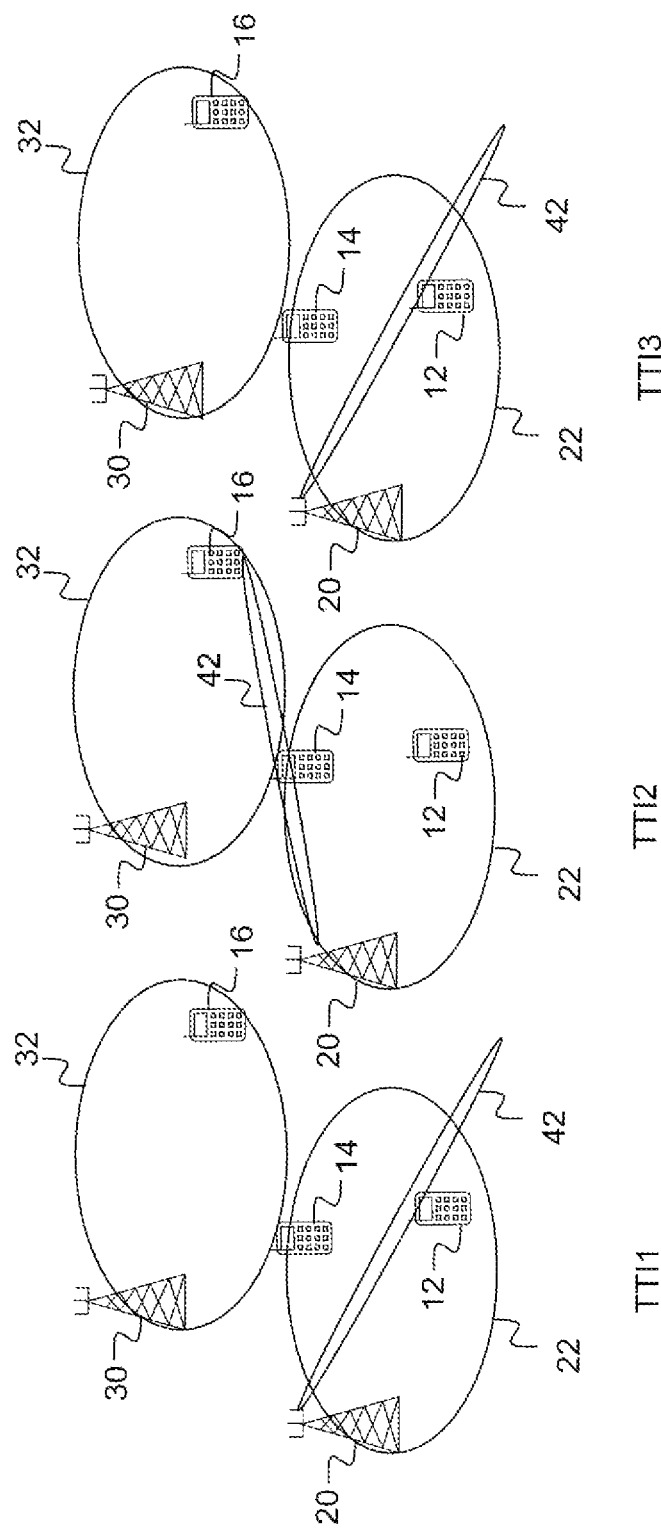
FIG. 1 is a view of a wireless communication network showing a communication scenario in three consecutive TTIs, wherein the transmitting RBS uses beam forming.
Figure 2:
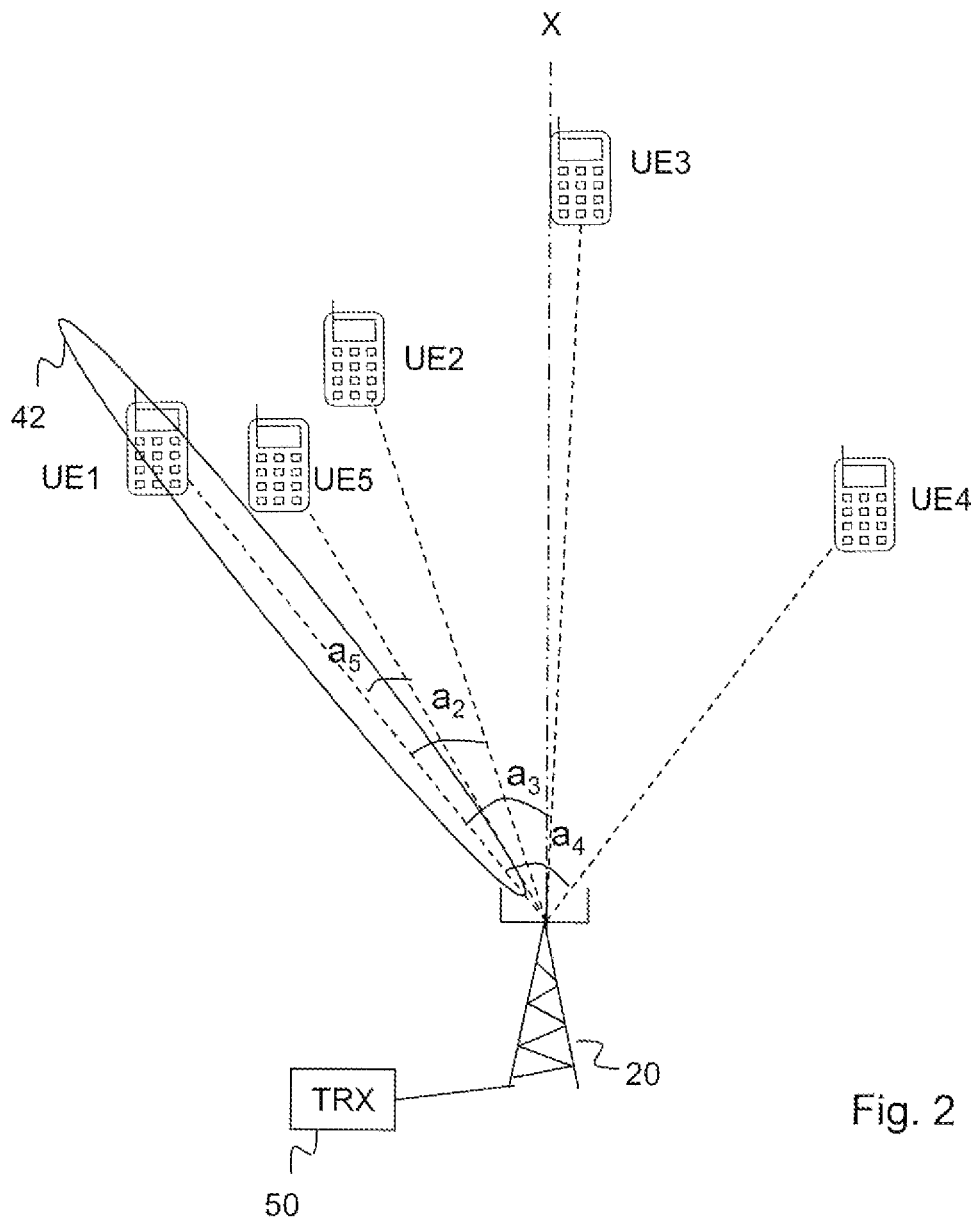
FIG. 2 is a view from above of an RBS transmitting to UEs using beam forming.

An embodiment of the invention will now be described in more detail with reference to FIG. 2. In a cell served by an RBS 20 there are five UEs: UE1, UE2, UE3, UE4, UE5. The RBS 20 is equipped with multiple antennas for beam forming, and a transceiver, TRX, 50. The antennas are connected to the TRX, 50. The transceiver is responsible for radio transmission and reception to the UEs. As mentioned, when beam forming is employed, the TRX 50 weights the signal to each antenna with a complex channel weight so that signals transmitted from the antennas can be added constructively in the direction of the receiving UE. In FIG. 2 a beam 42 of DL signals are directed to UE1. I.e., UE1 is the receiving UE. Further, transmission directions are determined to the five UEs served by the RBS 20. The transmission directions may be computed based on the complex channel weights for each UE. In such an alternative, the channel estimate may be used to calculate the complex channel weights. Such algorithms may be used in systems where the carrier frequency is the same in UL and DL such as in Time Division Duplex, TDD. Alternatively, the transmission directions may be determined explicitly by algorithms such as MUSIC or ESPRIT, which are direction finding algorithms for non-circular signals. The transmission directions are then used for calculating the complex channel weights.

In the following example, see table 1 and FIG. 2, the transmission directions are given in relation to an antenna boresight X-X, but the directions could be given in relation to any other reference, such as a certain UE.

TABLE 1

| Direction (degrees) | UE1: | UE2: | UE3: | UE 4: | UE5: |
|---|---|---|---|---|---|
| | 40 | 20 | −5 | −30 | 30 |

The determined transmission directions are then used to calculate differences in transmission directions, $a_2$-$a_5$, delta directions, between the different UEs and the currently receiving UE, in this case UE1. The delta directions may be an absolute value. The delta directions, $a_2$-$a_5$, are shown in table 2 and in FIG. 2.

TABLE 2

| Delta direction (degrees) | UE1: | UE2: | UE3: | UE4: | UE5: |
|---|---|---|---|---|---|
| | 0 | $a_2 = 20$ | $a_3 = 45$ | $a_4 = 70$ | $a_5 = 10$ |

The delta directions are then used for scheduling the plurality of UEs UE1-UE5. Scheduling is a process to select which UE's data flow to transmit during the next transmission, or TTI. A UE that has a lower delta direction value may be scheduled with a higher priority than a UE with a higher delta direction value. Also, the currently receiving UE, UE1, is involved in the scheduling. The currently receiving UE will in most cases have a delta direction value of around 0. In such cases, the UE1 will be scheduled with the highest priority with regard to the scheduling parameter delta direction. Accordingly, in the example above, the UEs may have the following scheduling priority, ranked on delta direction: UE1, UE5, UE2, UE3, UE4, wherein the UE with the highest priority is mentioned first and the UE with lowest priority is mentioned last. An exception to a case where UE1 is ranked first may be if UE1 is travelling with a high velocity and there has been a DL transmission interruption. Then it may be possible that UE1 (i.e. the UE last receiving a DL transmission) has a delta direction value that differs a lot from 0 and that the delta direction value is lower to another UE.

An algorithm for scheduling priority may take many scheduling parameters into consideration, whereof, according to an embodiment, the scheduling parameter delta direction may be one. Other scheduling parameters that may be taken into consideration when scheduling a UE for transmission in a consecutive TTI are radio transmission condition, historical bit rate and transmission delay. By "radio transmission condition" is meant a condition of the radio interface between the RBS and a UE. The radio transmission condition may be measured in signal strength for a DL signal received at a UE. If the radio transmission condition between the RBS and the second UE is better than the radio transmission condition between the RBS and the third UE, DL transmission to the second UE may be scheduled with a higher priority than DL transmission the third UE. By "historical bit rate" is meant bit rate between the RBS and a UE for an earlier time period. If the historical bit rate is lower for transmission from the RBS to the second UE than from the RBS to the third UE, DL transmission to the second UE may be scheduled with a higher priority than DL transmission to the third UE. If the transmission delay is higher for DL transmission to the second UE than for DL transmission to the third UE, DL transmissions to the second UE may be scheduled with a higher priority than DL transmissions to the third UE.

According to an embodiment, a scheduling priority algorithm may be described according to the following formula:

$$\text{scheduling priority} = w(\text{radio}) * w(\text{bit rate}) * w(\text{delay}) * w(\Delta), \quad (1)$$

wherein w(radio) means priority weight depending on radio transmission condition, w(bit rate) means priority weight depending on historical bit rate, w(delay) means priority weight depending on transmission delay, and w($\Delta$) means scheduling priority weight depending on the calculated difference in transmission direction in relation to the transmission direction to the first UE.

The function w($\Delta$) may be arranged so that the scheduling weight decreases linearly with the value of the delta direction. For example, w($\Delta$)=1/(A+B*($\Delta$)) where A and B are tuning parameters which for instance could be used to control the magnitude of w($\Delta$) thus increasing or decreasing the impact of the delta direction compared to for instance the radio environment.

A possible order in which UEs are scheduled for the exemplary scenario shown in FIG. 2, as an output of e.g. the scheduling priority formula (1) is shown below:

UE1, UE1, UE5, UE2, UE2, UE5, UE2, UE3, UE3, UE4, UE4, UE4 . . . .

This may be compared to a possible scheduling order when delta direction is not taken into consideration:

UE1, UE2, UE3, UE4, UE5, UE5, UE1, UE2, UE3, UE5, UE1, UE4 . . . .

Note that the scheduling orders are only examples. As can be seen from the examples, the change of beam direction between consecutive TTIs is reduced when delta direction is taken into consideration. This leads to less interference variations for the UEs in the neighbor cells, e.g. cell 32. Thanks to the reduced interference variations, the link adaption for UEs in the neighbor cells can more easily select a suitable Modulation and Coding Scheme and thus the UEs in the neighbor cells will experience a higher throughput. In addition, no co-scheduling of UEs may be necessary.

Figure 3:
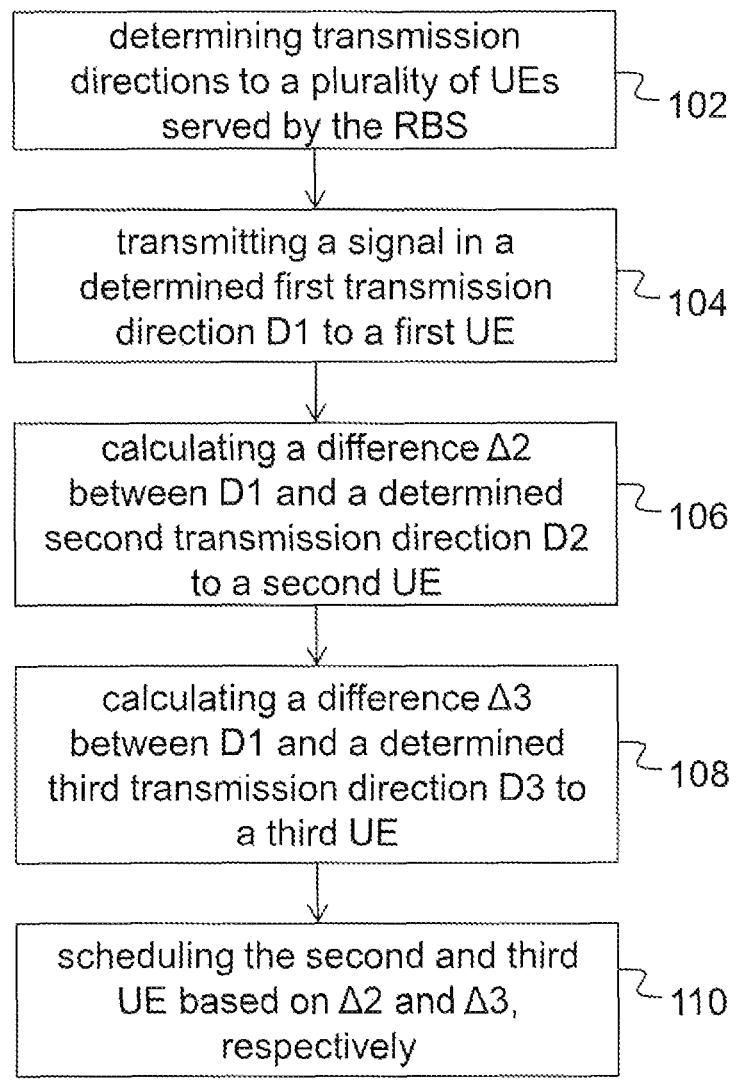
FIG. 3 is a flow chart illustrating a method in an RBS, according to a possible embodiment.

In FIG. 3, a method performed by an RBS in a wireless communication network for controlling transmission of signals from the RBS to UEs according to an embodiment is described. The method may comprise determining 102 transmission directions to a plurality of UEs served by the RBS and instructing to transmit 104 a signal in a determined first transmission direction D1 to a first UE, UE1, of the plurality of UEs. The method may further comprise calculating 106 a first difference $\Delta 2$ between the first transmission direction D1 and a determined second transmission direction D2 to a second UE, UE2, calculating 108 a second difference $\Delta 3$ between the first transmission direction D1 and a determined third transmission direction D3 to a third UE, UE3, and scheduling 110 transmission of signals to the second UE and the third UE based on the calculated first and second differences in transmission direction, $\Delta 2$ and $\Delta 3$, respectively.

By such a method that takes account for differences in transmission directions when scheduling UEs in a cell, the UEs may be scheduled such that there will be less rapid interference variations in neighboring cells. This will lead to an improved link adaption in the neighboring cells and higher throughput in the neighboring cells.

A transmission direction to a UE may be the direction from the RBS serving the UE to the served UE. The first UE may be defined to be the UE to which signals are currently transmitted. The first difference $\Delta 2$ between the first transmission direction D1 and the second transmission direction D2 may be the difference in degrees between the first transmission direction D1 and the second transmission direction D2. In the method described above it may be possible that the second UE is the same UE as the first UE. I.e. the first UE may be scheduled in the TTI following the current TTI in which a signal is sent to the first UE.

According to an embodiment, the determining 102 of transmission directions is based on beam forming weights associated with the plurality of UEs.

According to another embodiment, the second UE and the third UE are scheduled 110 based on the calculated first and second differences in transmission direction, $\Delta 2$ and $\Delta 3$, such that when the $\Delta 2$ is lower than the $\Delta 3$, the transmission of a signal to the second UE is scheduled with a higher priority than the transmission of a signal to the third UE.

According to yet another embodiment, the scheduling 110 of the transmission of signals to the second UE and third UE, except for being based on the first and second differences in transmission directions, is also based on at least one of the following scheduling characteristics: radio transmission condition; historical bit rate; and transmission delay.

According to still another embodiment, the scheduling 110 of the transmission of signals to the second UE and the third UE is further performed by setting a priority weight to each of the scheduling characteristics for each of the second UE and the third UE, including the difference in transmission direction. The priority weight is set according to the following formula, for each of the second UE and the third UE:

scheduling priority=$w$(radio)*$w$(bit rate)*$w$(delay)*$w(\Delta)$, wherein w(radio) means priority weight depending on radio transmission condition, w(bit rate) means priority weight depending on historical bit rate, w(delay) means priority weight depending on transmission delay, and $w(\Delta)$ means scheduling priority weight depending on the calculated difference in transmission direction in relation to the transmission direction to the first UE.

According to yet another embodiment, the scheduling 110 of the transmission of signals to the second UE and the third UE is further performed by calculating a scheduling priority weight $w(\Delta)$, for each of the second and third UE, depending on the calculated differences in transmission direction, $\Delta 2$ and $\Delta 3$, which scheduling priority weight $w(\Delta)$ decreases linearly with linearly increasing values of the differences in transmission direction $\Delta 2$ and $\Delta 3$, and wherein $w(\Delta)$ means scheduling priority weight depending on the calculated difference in transmission direction in relation to the transmission direction to the first UE.

According to yet another embodiment, the scheduling priority weight $w(\Delta)$ for each of the second and third UE is calculated as $w(\Delta)=1/(A+B*(\Delta))$, where A and B are tuning parameters and $\Delta$ is the difference in transmission direction. The tuning parameters A and B can be used for controlling the magnitude of the $w(\Delta)$ thus increasing or decreasing the impact of the $\Delta$-direction compared to the other scheduling characteristics.

Figure 4:
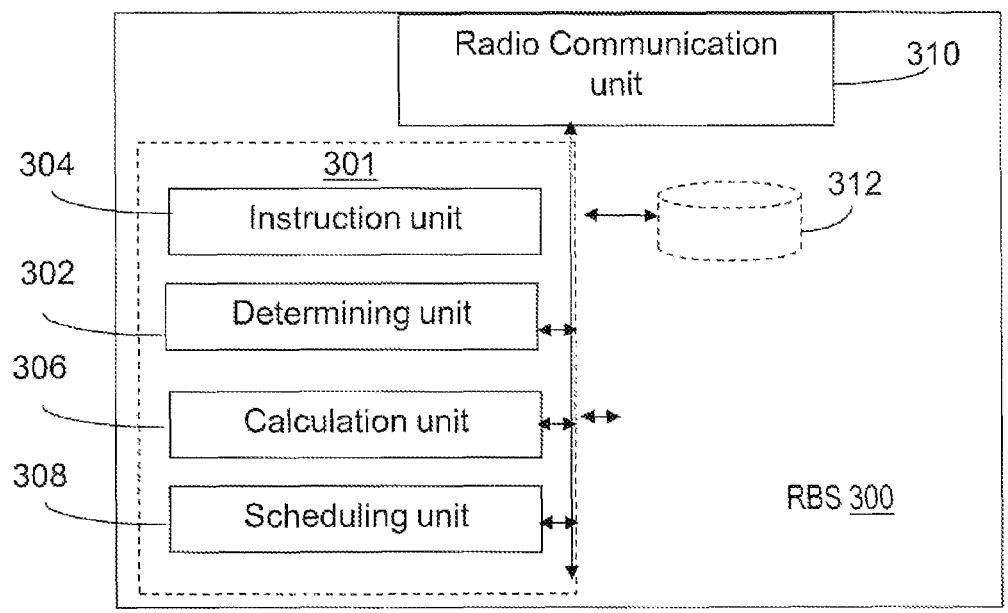
FIG. 4 is a schematic block diagram illustrating an RBS in more detail, according to further possible embodiments.

FIG. 4 shows an RBS 300 according to an embodiment. The RBS 300 is configured for controlling transmission of signals from the RBS 300 to user equipments, UEs. The RBS 300 is arranged to use beam forming to direct a signal towards a receiving UE. The RBS 300 comprises a determining unit 302 configured for determining transmission directions to a plurality of UEs served by the RBS 300 and a instruction unit 304 configured for instructing to transmit a signal in a determined first transmission direction, D1, to a first UE, UE1, of the plurality of UEs. The RBS 300 further comprises a calculation unit 306 configured for calculating a first difference $\Delta 2$ between the first transmission direction, D1, and a determined second transmission direction, D2, to a second UE, UE2, and for calculating a second difference, $\Delta 3$, between the first transmission direction D1 and a determined third transmission direction D3 to a third UE, UE3. The RBS 300 further comprises a scheduling unit 308 configured for scheduling transmission of signals to the second UE and the third UE based on the calculated first and second differences in transmission direction, $\Delta 2$ and $\Delta 3$, respectively. The RBS 300 may further comprise a radio communication unit 310, which may be considered to comprise conventional means for wireless communication from and/or to UEs, such as one or more transceivers. The RBS 300 may further comprise other functional units (not shown) for providing e.g. regular RBS functions. The RBS 300 may further comprise one or more storage units 312.

The determining unit 302, the instruction unit 304, the calculation unit 306 and the scheduling unit 308 may be arranged in an arrangement 301. The arrangement 301 could be implemented e.g. by one or more of: a processor or a micro processor and adequate software and storage therefore, a Programmable Logic Device (PLD) or other electronic component(s)/processing circuit(s) configured to perform the actions, or methods, mentioned above.

According to an embodiment, the determining unit 302 is configured for determining transmission directions based on beam forming weights associated with the plurality of UEs.

According to another embodiment, the scheduling unit 308 is configured for scheduling the second UE, UE2, and the third UE, UE3, based on the calculated first and second differences in transmission direction, $\Delta 2$ and $\Delta 3$, such that when the $\Delta 2$ is lower than the $\Delta 3$, the transmission of a signal to the second UE is scheduled with a higher priority than the transmission of a signal to the third UE.

According to yet another embodiment, the scheduling unit 308 is configured for scheduling the transmission of signals to the second UE and third UE, except for based on the first and the second differences in transmission directions, also based on at least one of the following scheduling characteristics: radio transmission condition; historical bit rate; and transmission delay.

According to another embodiment, the scheduling unit 308 is configured for scheduling transmission of signals to the second UE and the third UE by setting a priority weight to each of the scheduling characteristics for each of the second UE and the third UE, including the difference in transmission direction. The scheduling unit 308 is configured for scheduling according to the following formula, for each of the second UE and the third UE:

scheduling priority=$w$(radio)*$w$(bit rate)*$w$(delay)*$w(\Delta)$, wherein w(radio) means priority weight depending on radio transmission condition, w(bit rate) means priority weight depending on historical bit rate, w(delay) means priority weight depending on transmission delay, and $w(\Delta)$ means scheduling priority weight depending on the calculated difference in transmission direction in relation to the transmission direction to the first UE.

According to another embodiment, the scheduling unit 308 is configured for scheduling the second UE and the third UE by calculating a scheduling priority weight $w(\Delta)$, for each of the second and third UE, depending on the calculated differences in transmission direction, $\Delta 2$ and $\Delta 3$, which scheduling priority weight $w(\Delta)$ decreases linearly with linearly increasing values of the differences in transmission direction $\Delta 2$ and $\Delta 3$. Further, $w(\Delta)$ means scheduling priority weight depending on the calculated difference in transmission direction in relation to the transmission direction to the first UE.

According to another embodiment, the scheduling priority weight $w(\Delta)$ for each of the second and third UE is calculated as $w(\Delta)=1/(A+B*(\Delta))$, where A and B are tuning parameters. Further, $\Delta$ is the difference in transmission direction.

Figure 5:
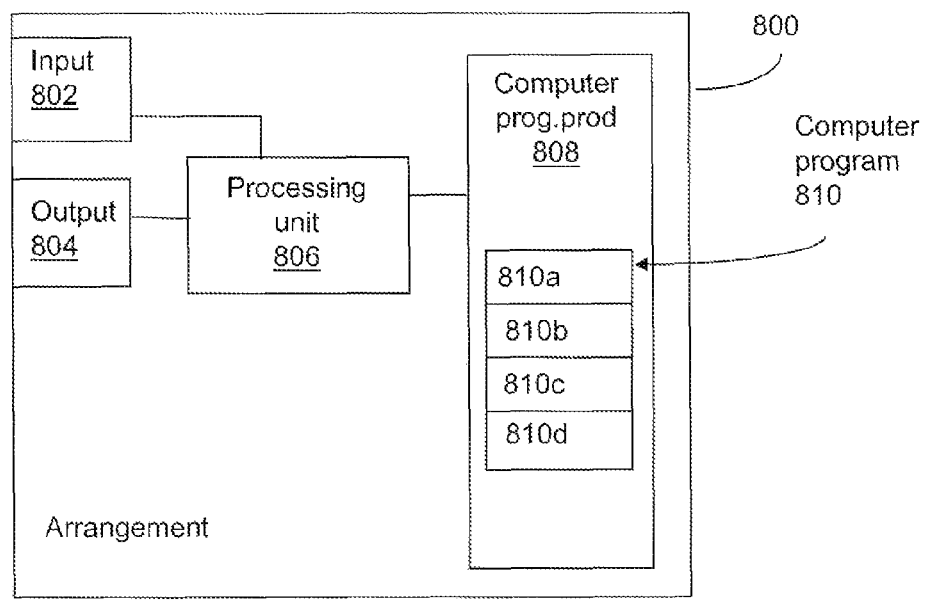
FIG. 5 is a schematic block diagram illustrating an arrangement in more detail, according to further possible embodiments.

FIG. 5 schematically shows an embodiment of an arrangement 800 for use in an RBS, which also can be an alternative way of disclosing an embodiment of the arrangement 301 in an RBS 300 illustrated in FIG. 4. Comprised in the arrangement 800 is a processing unit 806, e.g. with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity.

Furthermore, the arrangement 800 comprises at least one computer program product 808 in the form of a non-volatile or volatile memory, e.g. an Electrically Erasable Programmable Read-only Memory (EEPROM), a flash memory, a disk drive or a Random-access memory (RAM). The computer program product 808 comprises a computer program 810, which comprises code means, which when executed in the processing unit 806 in the arrangement 800 causes the arrangement and/or the RBS to perform the actions of any of the procedures described earlier in conjunction with FIG. 3.

The computer program 810 may be configured as a computer program code structured in computer program modules. Hence, in an exemplifying embodiment, the code means in the computer program 810 of the arrangement 800 comprises a determining module 810a for determining transmission directions to a plurality of UEs served by the RBS. The computer program further comprises an instruction module 810b for instructing to transmit a signal in a determined first transmission direction D1 to a first UE, UE1, of the plurality of UEs. The computer program further comprises a calculation module 810c for calculating a first difference Δ2 between the first transmission direction D1 and a determined second transmission direction D2 to a second UE, and for calculating a second difference Δ3 between the first transmission direction D1 and a determined third transmission direction D3 to a third UE. The computer program further comprises a scheduling module 810d for scheduling transmission of signals to the second UE and the third UE based on the calculated first and second differences in transmission direction, Δ2 and Δ3, respectively.

The processing unit 806 may be a single Central processing unit, CPU, but it could also comprise two or more processing units. For example, the processing unit may include general purpose microprocessors; instruction set processors and/or related chips sets and/or special purpose microprocessors such as Application Specific Integrated Circuits (ASIC). The processor may also comprise board memory for caching purposes. The computer program may be carried by a computer program product connected to the processor. The computer program product may comprise a computer readable medium on which the computer program is stored. For example, the computer program product may be a flash memory, a RAM, a Read-Only Memory (ROM) or an EEPROM, and the computer program modules described above could in alternative embodiments be distributed on different computer program products in the form of memories within the network node.

Although the code means in the embodiments disclosed above in conjunction with FIG. 5 are implemented as computer program modules which when executed in the processing unit causes the arrangement and/or the RBS to perform the actions described above in the conjunction with figures mentioned above, at least one of the code means may in alternative embodiments be implemented at least partly as hardware circuits.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

The invention claimed is:

1. A method performed by a radio base station, RBS, in a wireless communication network for controlling transmission of signals from the RBS to user equipments, UEs, wherein the RBS uses beam forming to direct a signal towards a receiving UE, the method comprising:
   determining transmission directions to a plurality of UEs served by the RBS;
   instructing to transmit a signal in a determined first transmission direction, D1, to a first UE (UE1) of the plurality of UEs;
   calculating a first difference, Δ2, between the first transmission direction, D1, and a determined second transmission direction, D2, to a second UE;
   calculating a second difference, Δ3, between the first transmission direction, D1, and a determined third transmission direction, D3, to a third UE;
   scheduling transmission of signals to the second UE and the third UE based on the calculated first and second differences in transmission direction, Δ2 and Δ3, respectively.

2. The method according to claim 1, wherein the determining of transmission directions is based on beam forming weights associated with the plurality of UEs.

3. The method according to claim 1, wherein the scheduling of the transmission of signals to the second UE and the third UE is based on the calculated first and second differences in transmission direction, Δ2 and Δ3, such that when the Δ2 is lower than the Δ3, the transmission of a signal to the second UE is scheduled with a higher priority than the transmission of a signal to the third UE.

4. The method according to claim 1, wherein the scheduling of the transmission of signals to the second UE and the third UE, except for being based on the first and second differences in transmission directions, is also based on at least one scheduling characteristic comprising: radio transmission condition; historical bit rate; or transmission delay.

5. The method according to claim 4, wherein the scheduling of the transmission of signals to the second UE and the third UE is further performed by setting a priority weight to each of the at least one scheduling characteristic for each of the second UE and the third UE, including the first and second differences in transmission directions, according to following formula, for each of the second UE and the third UE:

$$\text{scheduling priority} = w(\text{radio}) * w(\text{bit rate}) * w(\text{delay}) * w(\Delta), \text{ wherein}$$

w(radio) means priority weight depending on radio transmission condition, w(bit rate) means priority weight depending on historical bit rate, w(delay) means priority weight depending on transmission delay, and w(Δ) means scheduling priority weight depending on the calculated difference in transmission direction in relation to the transmission direction to the first UE.

6. The method according to claim 1, wherein the scheduling of transmission of signals to the second UE and the third UE is further performed by calculating a scheduling priority weight, w(Δ), for each of the second and third UE, depending on the calculated differences in transmission direction, Δ2 and Δ3, which scheduling priority weight w(Δ) decreases linearly with linearly increasing values of the differences in transmission direction, Δ2 and Δ3, and wherein w(Δ) means scheduling priority weight depending on the calculated difference in transmission direction in relation to the transmission direction to the first UE.

7. The method according to claim 6, wherein the scheduling priority weight, w(Δ), for each of the second and third UE is calculated as $$w(\Delta)=1/(A+B*(\Delta)),$$

where A and B are tuning parameters and Δ is the difference in transmission direction.

8. A radio base station, RBS, in a wireless communication network, configured for controlling transmission of signals from the RBS to user equipments, UEs, wherein the RBS is arranged to use beam forming to direct a signal towards a receiving UE, the RBS comprising:
 a determining unit configured for determining transmission directions to a plurality of UEs served by the RBS;
 an instruction unit configured for instructing to transmit a signal in a determined first transmission direction, D1, to a first UE (UE1) of the plurality of UEs;
 a calculation unit configured for calculating a first difference, Δ2, between the first transmission direction, D1, and a determined second transmission direction, D2, to a second UE (UE2), and for calculating a second difference, Δ3, between the first transmission direction D1 and a determined third transmission direction D3 to a third UE (UE3);
 a scheduling unit configured for scheduling transmission of signals to the second UE and the third UE based on the calculated first and second differences in transmission direction, Δ2 and Δ3, respectively.

9. An RBS according to claim 8, wherein the determining unit is configured for determining transmission directions based on beam forming weights associated with the plurality of UEs.

10. An RBS according to claim 8, wherein the scheduling unit is configured for scheduling the transmission of signals to the second UE (UE2) and the third UE (UE3) based on the calculated first and second differences in transmission direction, Δ2 and Δ3, such that when the Δ2 is lower than the Δ3, the transmission of a signal to the second UE is scheduled with a higher priority than the transmission of a signal to the third UE.

11. An RBS according to claim 8, wherein the scheduling unit is configured for scheduling the transmission of signals to the second UE and third UE, except for based on the first and the second differences in transmission directions, also based on at least one scheduling characteristic comprising: radio transmission condition; historical bit rate; or transmission delay.

12. An RBS according to claim 11, wherein the scheduling unit is configured for scheduling the transmission of signals to the second UE and the third UE by setting a priority weight to each of the at least one scheduling characteristic for each of the second UE and the third UE, including the first and second differences in transmission directions, according to following formula, for each of the second UE and the third UE:

scheduling priority=w(radio)*w(bit rate)*w(delay)*w(Δ), wherein w(radio) means priority weight depending on radio transmission condition, w(bit rate) means priority weight depending on historical bit rate, w(delay) means priority weight depending on transmission delay, and w(Δ) means scheduling priority weight depending on the calculated difference in transmission direction in relation to the transmission direction to the first UE.

13. An RBS according to claim 8, wherein the scheduling unit is configured for scheduling the second UE and the third UE by calculating a scheduling priority weight w(Δ), for each of the second and third UE, depending on the calculated differences in transmission direction, Δ2 and Δ3, which scheduling priority weight w(Δ) decreases linearly with linearly increasing values of the differences in transmission direction Δ2 and Δ3, and wherein w(Δ) means scheduling priority weight depending on the calculated difference in transmission direction in relation to the transmission direction to the first UE.

14. An RBS according to claim 13, wherein the scheduling priority weight, w(Δ), for each of the second and third UE is calculated as w(Δ)=1/(A+B*(Δ)), where A and B are tuning parameters, and Δ is the difference in transmission direction.

15. A non-transitory computer-readable medium comprising computer readable code means, which when run in a Radio Base Station, RBS, causes the RBS to perform the following:
 determining transmission directions to a plurality of UEs served by the RBS;
 instructing to transmit a signal in a determined first transmission direction, D1, to a first UE (UE1) of the plurality of UEs;
 calculating a first difference, Δ2, between the first transmission direction, D1, and a determined second transmission direction, D2, to a second UE (UE2);
 calculating a second difference, Δ3, between the first transmission direction, D1, and a determined third transmission direction, D3, to a third UE; and
 scheduling transmission of signals to the second UE and the third UE based on the calculated first and second differences in transmission direction, Δ2 and Δ3, respectively.

* * * * *